United States Patent
Tsuchiya et al.

(10) Patent No.: US 9,971,588 B2
(45) Date of Patent: May 15, 2018

(54) INFORMATION PROCESSING APPARATUS, CONTROL METHOD THEREOF, PROGRAM AND INFORMATION RECORDING MEDIUM

(71) Applicant: Sony Computer Entertainment Inc., Tokyo (JP)

(72) Inventors: Akitsugu Tsuchiya, Kanagawa (JP); Shigeru Enomoto, Kanagawa (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days. days.

(21) Appl. No.: 15/040,336

(22) Filed: Feb. 10, 2016

(65) Prior Publication Data

US 2016/0253165 A1    Sep. 1, 2016

(30) Foreign Application Priority Data

Feb. 27, 2015    (JP) ................. 2015-038354

(51) Int. Cl.
*G06F 9/445* (2006.01)
*G06F 11/14* (2006.01)
*H04L 29/08* (2006.01)

(52) U.S. Cl.
CPC ............ *G06F 8/65* (2013.01); *G06F 11/1464* (2013.01); *G06F 2201/84* (2013.01); *H04L 67/12* (2013.01)

(58) Field of Classification Search
CPC .... G06F 8/65; G06F 11/1464; G06F 2201/84; H04L 67/12; Y02B 60/183
USPC .......................................................... 717/168
See application file for complete search history.

(56) References Cited

U.S. PATENT DOCUMENTS

| | | | | |
|---|---|---|---|---|
| 2006/0130046 A1* | 6/2006 | O'Neill | ..................... | G06F 8/65 717/168 |
| 2007/0055970 A1* | 3/2007 | Sakuda | ..................... | G06F 8/65 717/168 |
| 2010/0255883 A1* | 10/2010 | Takahashi | ................. | G06F 8/65 455/566 |
| 2012/0174090 A1* | 7/2012 | Carollo | ..................... | G06F 8/65 717/173 |
| 2014/0351803 A1* | 11/2014 | Hoffman | ................... | G06F 8/65 717/168 |

* cited by examiner

*Primary Examiner* — Qing Chen
*Assistant Examiner* — Mohammed Huda
(74) *Attorney, Agent, or Firm* — Katten Muchin Rosenman LLP

(57) ABSTRACT

Disclosed herein is an information processing apparatus on which software is installed. The information processing apparatus includes: an update block configured to update the software independently of a user instruction if update of the software is ready; and an update limitation block configured to limit update of the software executed by the update block if a predetermined condition is satisfied.

7 Claims, 3 Drawing Sheets

FIG.3

AUTOMATIC DOWNLOAD SETTING

- UPDATE DATA OF SYSTEM SOFTWARE ☑
  - UPDATE AUTOMATICALLY ☐
    UPDATE IS EXEUCTED IN STANDBY STATE.
    DATA OF APPLIATION PROGRAM UNDER
    EXECUTION IS DELETED.

- UPDATE DATA OF APPLICATION PROGRAM ☑

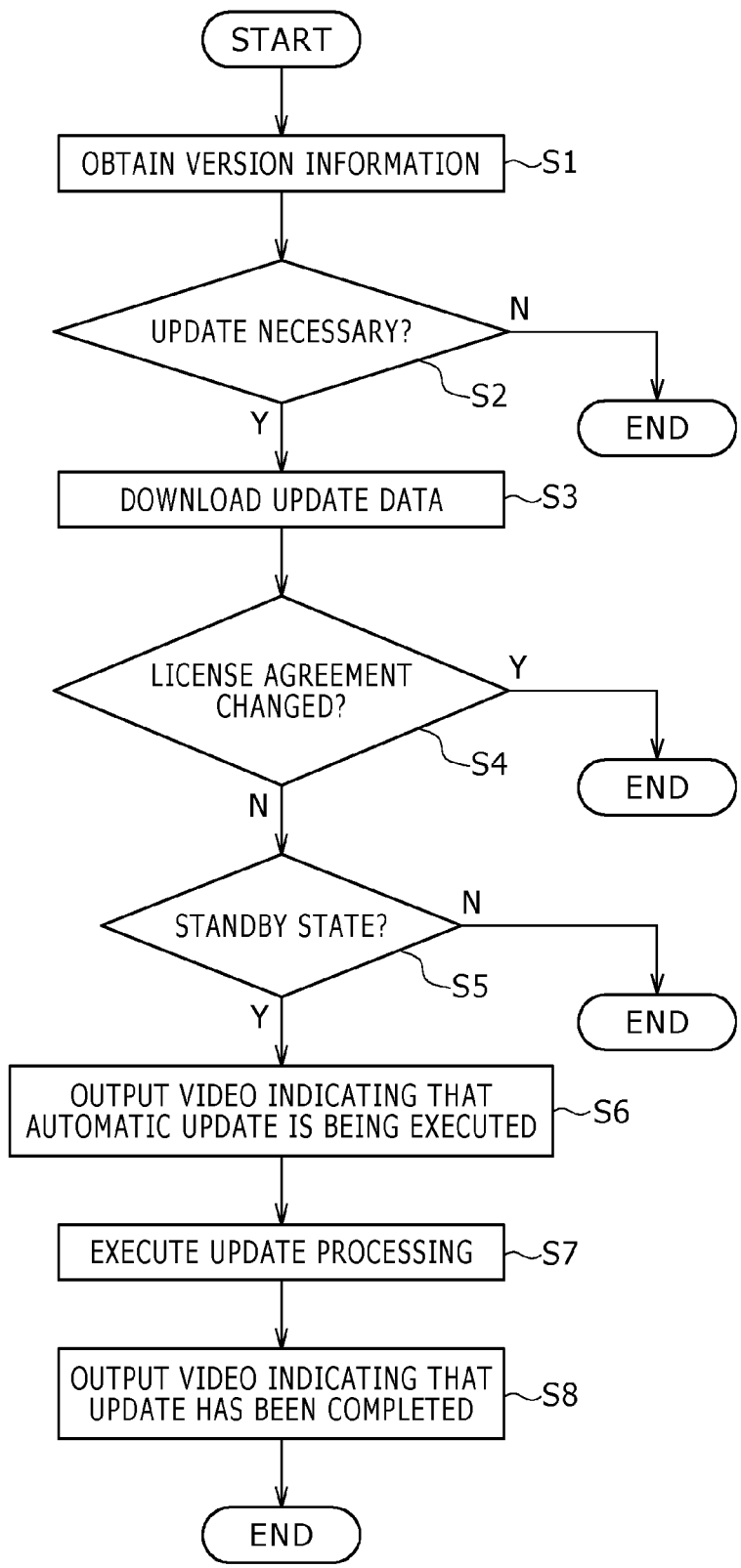

INFORMATION PROCESSING APPARATUS, CONTROL METHOD THEREOF, PROGRAM AND INFORMATION RECORDING MEDIUM

BACKGROUND

The present disclosure relates to an information processing apparatus configured to update software, a control method for this information processing apparatus, a control program for this information processing apparatus, and an information recording medium.

For a method updating software installed on an information processing apparatus, a method is available in which update data for the software is downloaded through a communication network and installed on the information processing apparatus. In addition, a technology is proposed in which, in order to execute such software update without bothering users, automatic update processing is executed upon satisfaction of such conditions other than user instructions as the arrival of a predetermined timing for example.

SUMMARY

However, in the related-art technologies described above, software is updated without instructions by a user of an information processing apparatus on which software update is executed, so that the update processing may possibly be executed in a state unfavorable to the user or the information processing apparatus.

It is therefore desirable to provide an information processing apparatus that prevents execution of processing of updating software in an undesired condition, a method of controlling this information processing apparatus, a program for controlling this information processing apparatus, and an information storage medium.

According to an embodiment of the present disclosure, there is provided an information processing apparatus on which software is installed. This information processing apparatus includes: an update block configured to update the software independently of a user instruction if update of the software is ready; and an update limitation block configured to limit update of the software executed by the update block if a predetermined condition is satisfied.

According to another embodiment of the present disclosure, there is provided a method of controlling an information processing apparatus on which software is installed. This method includes: updating the software independently of a user instruction if update of the software is ready; and limiting update of the software executed independently of the user instruction if a predetermined condition is satisfied.

According to a further embodiment of the present disclosure, there is provided a program for an information processing apparatus on which software is installed. The program includes: by an update block, updating the software independently of a user instruction if update of the software is ready; and by an update limitation block, limiting update of the software executed by the update block if a predetermined condition is satisfied.

According to a still further embodiment of the present disclosure, there is provided a computer-readable information storage medium storing a program for an information processing apparatus on which software is installed. The program includes: by an update block, updating the software independently of a user instruction if update of the software is ready; and by an update limitation block, limiting update of the software executed by the update block if a predetermined condition is satisfied.

BRIEF DESCRIPTION OF THE DRAWINGS

Other objects and advantages of the present disclosure will become apparent from the following description of embodiment with reference to the accompanying drawings in which:

FIG. 3 is a diagram illustrating one example of an automatic update setting screen; and FIG. 4 is a flowchart indicative of one example of a processing flow of the above-mentioned information processing apparatus.

DETAILED DESCRIPTION OF THE PREFERRED EMBODIMENT

An embodiment of the present disclosure will be described in detail with reference to the accompanying drawings.

Figure 1:
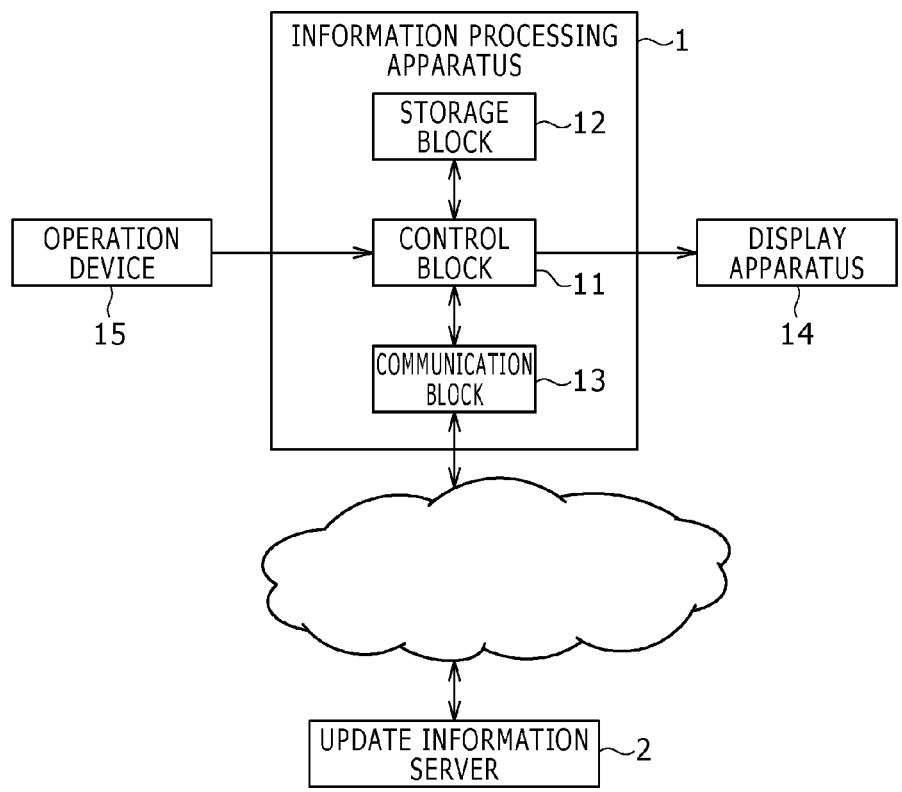
FIG. 1 is a configurational block diagram illustrating a configuration of an information processing apparatus according to an embodiment of the present disclosure.

Now, referring to FIG. 1, there is shown a configurational block diagram illustrating a configuration of an information processing apparatus according to the embodiment of the present disclosure. An information processing apparatus 1 is a home game machine, a portable game machine, a personal computer, a smartphone, and so on, for example, on which software that is a target of update processing in the present embodiment (hereafter referred to as software subject to update) is installed. It should be noted that two or more software programs may be updated. As shown in FIG. 1, the information processing apparatus 1 has a control block 11, a storage block 12, and a communication block 13. In addition, the information processing apparatus 1 is connected to a display apparatus 14 and an operation device 15.

The control block 11 includes a central processing unit (CPU) and so on and runs a program stored in the storage block 12 to execute various information processing operations. Specific examples of the processing that is executed by the control block 11 in the present embodiment will be described later.

The storage block 12 includes a memory device such as a random access memory (RAM) and a nonvolatile storage medium such as a hard disk drive and stores programs to be executed by the control block 11 and data to be processed by these programs. Especially, in the present embodiment, program data of the software subject to update is stored in the storage block 12.

The communication block 13 is a communication interface such as a local area network (LAN) card. The information processing apparatus 1 is connected to a communication network such as the Internet through the communication block 13. The information processing apparatus 1 executes data communication with an external update information server 2 through this communication network. The update information server 2 has a function of providing update data of the software subject to update to the information processing apparatus 1.

The display apparatus 14 is a home television receiver or a liquid crystal display, for example, and displays an image corresponding to a video signal entered from the information processing apparatus 1 onto a screen. The operation device 15 is a keyboard, a mouse, or a controller of a home game machine, for example, that accepts input operations from a user. It should be noted that the display apparatus 14 and the operation device 15 may be built inside a housing of the information processing apparatus 1 or may be discrete units connected to the information processing apparatus 1 in a wired or wireless manner.

Figure 2:
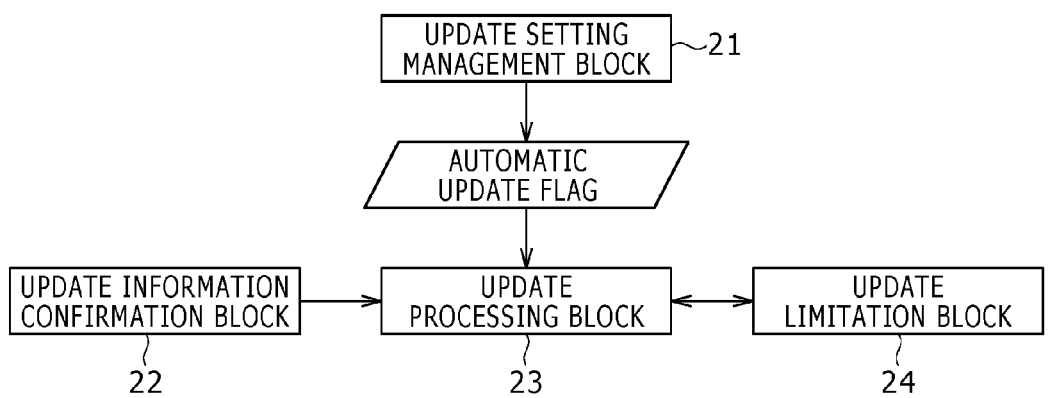
FIG. 2 is a functional block diagram illustrating functions of the above-mentioned information processing apparatus.

The following describes functions to be realized by the information processing apparatus 1 with reference to FIG. 2. As shown in FIG. 2, the information processing apparatus functionally has an update setting management block 21, an update information confirmation block 22, an update processing block 23, and an update limitation block 24. These functions are realized by the operation of the control block 11 in accordance with a program stored in the storage block 12. This program may be provided to the information processing apparatus 1 through a communication network such as the Internet or as stored in a computer-readable information storage medium such as an optical disc.

The update setting management block 21 manages setting information associated with automatic update of software subject to update. To be more specific, the update setting management block 21 stores flag information indicative of whether or not to automatically update the software subject to update (hereafter referred to as an automatic update flag) in the storage block 12 and updates a value of the automatic update flag in accordance with a user instruction. FIG. 3 shows one example of an automatic update setting screen. The update setting management block 21 displays a setting screen as illustrated in FIG. 3 onto the screen of the display apparatus 14 in accordance with an instruction operation done by the user on the operation device 15 and accepts an instruction for changing the setting contents from the user in that state. Next, if an instruction for setting change comes from the user, the update setting management block 21 updates the value of the automatic update flag stored in the storage block 12 in accordance with the contents of the accepted instruction. In the example shown in FIG. 3, the automatic update flag is turned on when the user checks the check box arranged on the side of "UPDATE AUTOMATI-CALLY."

In the example shown in FIG. 3, it is assumed that the software subject to update be system software. The system software is the basic software for realizing basic functions used for the operation of a computer such as control of hardware. The system software may be installed on the information processing apparatus 1 by the manufacturer thereof before the shipment. If the software subject to update is the system software, the information processing apparatus 1 may be restarted or each application program under execution may be stopped at the time update processing is executed. Therefore, the automatic update flag is off as default, so that the software subject to update is automatically updated only when the user explicitly instructs to turn on the automatic update flag. In addition, as shown in the figure, in receiving a change of the automatic update flag from the user, the update setting management block 21 displays a text for describing the effect to be resulted by turning on of the automatic update flag, thereby allowing the user to make confirmation of the contents of that effect in advance. Further, in the example shown in FIG. 3, the user can select not only whether to automatically execute the update processing itself but also whether to automatically execute the downloading of update data. The user is allowed to select an option of automatic execution of only the downloading of update data without executing the automatic update processing.

It should be noted that, in FIG. 3, automatic update processing is selected or not selected only for the system software; it is also practicable to select the automatic update processing for application software programs other than the system software. In this case, the update setting management block 21 may accept from the user the selection whether to execute automatic update processing for each of two or more software programs. Further, the update setting management block 21 may accept the selection whether to execute automatic update processing by the types of software, for the entire application software programs for example.

The update information confirmation block 22 makes confirmation whether update processing for the software subject to update is ready or not. If the automatic update flag is on, then the update information confirmation block 22 makes confirmation whether update processing is ready or not with a timing when predetermined conditions are satisfied, such as a timing with which a predetermined time has come, without following an explicit instruction issued by the user. If the automatic update flag is off, the update information confirmation block 22 may make confirmation whether update processing is ready or not with a timing with which the user explicitly gives an instruction for update confirmation or may execute the confirmation whether update processing is ready or not without the user instruction as with the case where the automatic update flag is on.

To be more specific, the update information confirmation block 22 enquires the update information server 2 for the readiness of update processing of the software subject to update. For example, the update information confirmation block 22 gets version information of the software subject to update from the update information server 2 and compares the version of the software subject to update installed on the information processing apparatus 1 with the obtained version, thereby determining update processing is ready if the version of the software subject to update provided by the update information server 2 is found more recent than the version of the software subject to update installed on the information processing apparatus 1.

If the update processing of the software subject to update is found ready by the update information confirmation block 22, then the update processing block 23 updates the software subject to update. Especially, if the automatic update flag is on, the update processing block 23 automatically executes the update processing of the software subject to update without an explicit instruction issued by the user. That is, update processing is started upon satisfaction of conditions (for example, arrival of a predetermined time) other than any instruction operation by the user.

To be more specific, the update processing block 23 first downloads the update data for the software subject to update from the update information server 2. The update data may be replacement data that overwrites at least part of the program data of the software subject to update, patch data that changes the contents of the program, or additional data that operates along with the program. When the update data is downloaded, the update processing block 23 changes the program of the software subject to update by use of the downloaded update data or stores in the storage block 12 the update data such that the update data operates as part of the software subject to update. The update processing described so far updates the software subject to update to a new version.

It should be noted that, if the automatic update flag is off, the update processing block 23 executes the update processing upon receiving the explicit instruction from the user. However, as with the confirmation of update information, the update processing may be executed automatically without the user instruction before the downloading of update data. In this case, the update processing block 23 may send a message to the user that update processing is ready at the time the update data has been downloaded, thereby prompting the user to execute the update processing.

The update limitation block 24 limits update processing in order to prevent the automatic update of the software subject to update by the update processing block 23 if predetermined conditions are satisfied. Especially, if the automatic update flag is on, the update limitation block 24 determines whether to actually execute automatic update processing on the basis of predetermined conditions; if a problem is found in the automatic update processing, the update limitation block 24 cancels the automatic update processing to be executed by the update processing block 23.

The following describes some specific examples of predetermined conditions for the update limitation block 24 to determine whether to limit automatic update.

First, an example in which conditions associated with operation states of the information processing apparatus 1 are used will be described. For a first example, the update limitation block 24 determines whether a particular application program is being executed on the information processing apparatus 1; if the particular application program is found being executed, then the update limitation block 24 may limit automatic update processing. In this example, if a particular application program is being executed with a timing with which the update processing block 23 attempts to execute the automatic update of the software subject to update upon reaching of a predetermined time, the automatic update processing is cancelled. Here, the update limitation block 24 may determine whether to limit the automatic update processing for individual application programs or for an application program of a particular type such as a game program. For example, if the software subject to update is system software, then, if the system software is automatically updated, the processing of the application program being used by the user is cancelled, thereby possibly causing disadvantages to the user. Hence, limiting the automatic update processing under the condition that a particular application program is being executed can prevent the execution of a particular application program from being cancelled.

Next, for a second example, the update limitation block 24 may limit automatic update processing depending on whether the information processing apparatus 1 is in a working state or a standby state. To be more specific, if the information processing apparatus 1 is in a working state, then the information processing apparatus 1 limits automatic update processing; if the information processing apparatus 1 is in a standby state, the information processing apparatus 1 executes automatic update processing. Here, a standby state denotes a state in which, the power to the information processing apparatus 1 being on, the power is supplied only to some of various electronic components making up the information processing apparatus 1, not to the other electronic components that are therefore not functioning. Even in such a standby state, the power is kept supplied to a component used for the execution of the processing for determining whether automatic update is required or not in order to put this component in an active state. However, by limiting power supply to the other components, the total power dissipation can be suppressed as compared with that in a working state. Especially, in a standby state, the functions used for displaying video on the display apparatus 14 and accepting input operations from the operation device 15 may be put in a stopped state. Conversely, a working state denotes a state in which, the information processing apparatus 1 being powered on and not in a standby state, the user is using the information processing apparatus 1 that accepts input operations from the user and displays images to be presented to the user onto the display apparatus 14. In a working state, the update limitation block 24 limits automatic update processing to prevent automatic update processing while the user is using the information processing apparatus 1, resulting in the restart of the information processing apparatus 1.

In this second example, only when the information processing apparatus 1 is in a standby state, the software subject to update is automatically updated. If automatic update processing is executed in a standby state, the update processing block 23 may execute special control on the display apparatus 14. To be more specific, at the time of automatic update, the update processing block 23 continues to output a video signal indicative that update processing is on to the display apparatus 14 without outputting a control signal for operating the display apparatus 14. In a standby state, the user is not using the information processing apparatus 1, so that there is basically no need to make the display apparatus 14 display any video. Rather, it is considered undesirable that, in order to execute automatic update, the information processing apparatus 1 transitions from a standby state to a working state, thereby suddenly displaying video on the display apparatus 14 without receiving the user instruction. Therefore, in executing automatic update processing, the update processing block 23 is so set that it does not output a control signal for operating the display apparatus 14. For example, the information processing apparatus 1 is connected to the display apparatus 14 by an high definition multimedia interface (HDMI: registered trademark), the information processing apparatus 1 normally outputs a consumer electronics control (CEC) command for starting the operation of the display apparatus 14 when displaying video. However, it is so set here that, when the information processing apparatus 1 in a standby state starts automatic update processing, the information processing apparatus 1 does not output this CEC command. On the other hand, if the user happens to use the information processing apparatus 1 while automatic update processing is going, a trouble will happen if the user cannot recognize that automatic update processing is going. Therefore, the update processing block 23 outputs a video signal indicative that software is being updated to the display apparatus 14 during the execution of automatic update processing, thereby notifying the user thereof. This control allows the video indicative that update processing is on to be displayed on the display apparatus 14 when the user happens to use the information processing apparatus 1 by operating the display apparatus 14, while nothing is displayed on the display apparatus 14 during the execution of automatic update unless the user makes any operation. It should be noted that, during the execution of automatic update processing, the update processing block 23 may indicate that the processing is on by turning on a predetermined light or changing colors of the turned-on light arranged on a surface of the housing of the information processing apparatus 1.

In the first and second examples described above, automatic update processing is limited in accordance with the operation state of the information processing apparatus 1. In addition, the update limitation block 24 may limit automatic update processing in accordance with the contents of update data. To be more specific, for a third example, the update limitation block 24 may limit automatic update processing if there is a change in the license agreement of the software subject to update. If there occurs a change in the license agreement as the contents of the software subject to update changes, the information processing apparatus 1 cannot update the version of the software subject to update to the version corresponding to the license agreement after change unless user's consent is obtained about contents of the license agreement after change. Therefore, if a change in the license agreement takes place, the update limitation block 24 limits the automatic update processing of the software subject to update.

To be more specific, it is assumed that, in order to make confirmation of whether there is a change in the license agreement, version information be assigned also to the license agreement of the software subject to update in addition to the version information of the software subject to update itself. If the license agreement needs to be changed, the provider of update data registers the license agreement after change and the version information thereof into the update information server 2 along with update data. In enquiring the update information server 2 for the presence or absence of the update data of the software subject to update, the update information confirmation block 22 also enquires for the version information of the license agreement after change. Next, the update limitation block 24 compares the version information of the license agreement obtained from the update information server 2 with the version information of the license agreement stored in the storage block 12 and, if no match is found, limits the automatic update processing of the software subject to update by the update processing block 23. Then, the update processing block 23 presents the license agreement after change obtained from the update information server 2 to the user at a timing when the user gives an instruction for the update of software subject to update or a timing when the user transitions the information processing apparatus 1 from a standby state to a working state to start the use, for example. Next, after receiving from the user an instruction for the consent to the license agreement after change, the update processing block 23 executes update processing.

The following describes one example of a flow of the processing that is executed when the information processing apparatus 1 according to the present embodiment executes automatic update processing, with reference to a flowchart shown in FIG. 4. It is assumed that the processing explained here be executed with a timing of the arrival of a predetermined time if the automatic update flag is set on. In addition, it is assumed that, in this example, determination be made whether to limit automatic update by use of the determination conditions used in the second and third examples described above.

First, the update information confirmation block 22 obtains the most recent version information of the software subject to update and the version information of the license agreement from the update information server 2 (S1). Next, the update information confirmation block 22 compares the obtained most recent version information of the software subject to update with the version information of the software subject to update stored in the storage block 12 to determine whether it is necessary to execute update processing (S2). If the update processing is found unnecessary (namely, it the version information stored in the storage block 12 is found to be the most recent version), then the update information confirmation block 22 ends the processing at that moment.

If the update processing is found necessary in step S2, then the update processing block 23 downloads the update data of the software subject to update from the update information server 2 (S3). When the update data has been completely downloaded, the update limitation block 24 compares the version information of the license agreement obtained in step S1 with the version information of the license agreement stored in the storage block 12 to determine whether there is any change in the license agreement (S4). If the change is found necessary in step S4, then the update limitation block 24 discontinues the automatic update being executed by the update processing block 23, thereby ending the update processing. In this case, if the information processing apparatus 1 is in a working state, then the update processing block 23 may output a message indicative of the presence of the update data. If the information processing apparatus 1 is in a standby state, the update processing block 23 may output a message indicative of the presence of the update data when the user next starts using the information processing apparatus 1 and transitions the information processing apparatus 1 to a working state. In any case, before starting the update processing, the update processing block 23 obtains the changed license agreement from the update information server 2, presents the obtained license agreement to the user, and obtains the user's consent to the contents of this license agreement.

If the license agreement is found having no change in step S4, then the update limitation block 24 determines whether the information processing apparatus 1 is in a working state or a standby state at that moment (S5). If the information processing apparatus 1 is found to be in a working state, then automatic update is limited, upon which the update processing comes to an end. In this case too, as with the case where a change takes place in the license agreement, the update processing block 23 may output a message indicative of the presence of update data.

If the information processing apparatus 1 is found in a standby state in step S5, the update processing block 23 executes automatic update processing. To be more specific, first, the update processing block 23 outputs a video signal for making the display apparatus 14 display a video indicative that automatic update is being executed (S6). Here, as described above, the update processing block 23 outputs the video signal but does not output a control signal for starting the displaying of the display apparatus 14. Hence, the screen of the display apparatus 14 displays no video.

Next, the update processing block 23 executes the update processing of the software subject to update by use of the update data downloaded in step S3 (S7). At this moment, if the update processing requites, the update processing block 23 may start up part of the electronic components that are stopped during the standby state. Alternatively, as required, the update processing block 23 may restart the information processing apparatus 1.

When the update processing comes to an end, the update processing block 23 outputs a video signal for making the display apparatus 14 display a video indicative of the completion of the update processing (S8). This is intended to notify, if the user operates the display apparatus 14 by himself or herself to check the video, the user of the completion of the update processing. When a certain time has passed after the output of the video signal of step S8, the update processing block 23 ends the update processing. At this moment, if there is any electronic component powered for the update processing, the update processing block 23 stops that electronic component again, thereby returning the information processing apparatus 1 to a normal standby state.

With the information processing apparatus 1 according to the present embodiment described above, the automatic update processing of the software subject to update can be limited in accordance with a state of the information processing apparatus 1 or the presence or absence of necessity of user confirmation.

It should be noted that embodiments of the present disclosure are not limited to the embodiment described above. For example, in the above description, the software subject to update is system software; however, also in the case where application software or the like other than the system software is updated, the update limitation described above may be applied. In addition, above-described predetermined conditions for determining whether to limit automatic update processing may be used in combinations.

The present disclosure contains subject matter related to that disclosed in Japanese Priority Patent Application JP 2015-038354 filed in the Japan Patent Office on Feb. 27, 2015, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus on which software is installed, comprising:
   an update block configured to update the software independently of a user instruction if update of the software is ready; and
   an update limitation block configured to limit update of the software executed by the update block if a predetermined condition is satisfied;
   the information processing apparatus being connected with a display apparatus,
   wherein the update limitation block limits a start of the update if the information processing apparatus is in a working state and does not limit the update if the information processing apparatus is in a standby state,
   wherein an update started in the standby state is continued if the information processing apparatus is transitioned from the standby state to the working state, and
   wherein, in the standby state, the update block, in executing the update, does not output a control signal for activating the display apparatus but outputs a video signal indicative that the software is being updated to the display apparatus such that the video signal is displayed on the display apparatus if the information processing apparatus is transitioned from the standby state to the working state by a user while the update is executed.

2. The information processing apparatus according to claim 1,
   wherein, if the information processing apparatus is executing a particular application program, the update limitation block limits the update.

3. The information processing apparatus according to claim 1, further comprising
   a confirmation block configured to make confirmation of presence or absence of a change in a license agreement of the software,
   wherein, if a change is found in the license agreement, the update limitation block limits the update.

4. The information processing apparatus according to claim 1, wherein, in the working state, the user is notified of the update of the software by a display on the display apparatus, and
   wherein, in the standby state, the user is notified of the update of the software by activating a light on a housing of the information processing apparatus in a predetermined pattern.

5. The information processing apparatus according to claim 1, wherein, in the working state, the user is notified of the update of the software by a display on the display apparatus, and
   wherein, in the standby state, the user is notified of the update of the software by changing colors of a light on a housing of the information processing apparatus in a predetermined pattern.

6. A method of controlling an information processing apparatus on which software is installed, comprising:
   updating the software independently of a user instruction if update of the software is ready; and
   limiting update of the software executed independently of the user instruction if a predetermined condition is satisfied,
   wherein the information processing apparatus is connected with a display apparatus,
   wherein a start of the update is limited if the information processing apparatus is in a working state and is not limited if the information processing apparatus is in a standby state,
   wherein an update started in the standby state is continued if the information processing apparatus is transitioned from the standby state to the working state, and
   wherein, in the standby state, a control signal for activating the display apparatus is not output, but a video signal is output to the display apparatus indicative that the software is being updated such that the video signal is displayed on the display apparatus if the information processing apparatus is transitioned from the standby state to the working state by a user while the update is executed.

7. A non-transitory computer-readable information storage medium storing a program for an information processing apparatus on which software is installed, the program comprising:
   by an update block, updating the software independently of a user instruction if update of the software is ready; and
   by an update limitation block, limiting update of the software executed by the update block if a predetermined condition is satisfied,
   the information processing apparatus being connected with a display apparatus,
   wherein the update limitation block limits the update if the information processing apparatus is in a working state and does not limit the update if the information processing apparatus is in a standby state,
   wherein an update started in the standby state is continued if the information processing apparatus is transitioned from the standby state to the working state, and
   wherein, in the standby state, the update block, in executing the update, does not output a control signal for activating the display apparatus but outputs a video signal indicative that the software is being updated to the display apparatus such that the video signal is displayed on the display apparatus if the information processing apparatus is transitioned from the standby state to the working state by a user while the update is executed.

\* \* \* \* \*